(No Model.)

C. P. STEINMETZ.
MONOCYCLIC MOTOR.

No. 533,249. Patented Jan. 29, 1895.

WITNESSES
A. F. Macdonald.
B. B. Hull.

INVENTOR
Charles P. Steinmetz
By R. Blodgett
Atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

MONOCYCLIC MOTOR.

SPECIFICATION forming part of Letters Patent No. 533,249, dated January 29, 1895.

Application filed November 20, 1894. Serial No. 529,415. (No model.)

*To all whom it may concern:*

Be it known that I, CHARLES P. STEINMETZ, a subject of the Emperor of Germany, residing at Schenectady, county of Schenectady, State of New York, have invented certain new and useful Improvements in Monocyclic Induction-Motors, of which the following is a specification.

The present invention consists of a novel form of alternating current motor of the induction type, which is substantially a single-phase alternating induction motor, but possesses several novel features which will be hereinafter more fully set forth.

Figure 1:
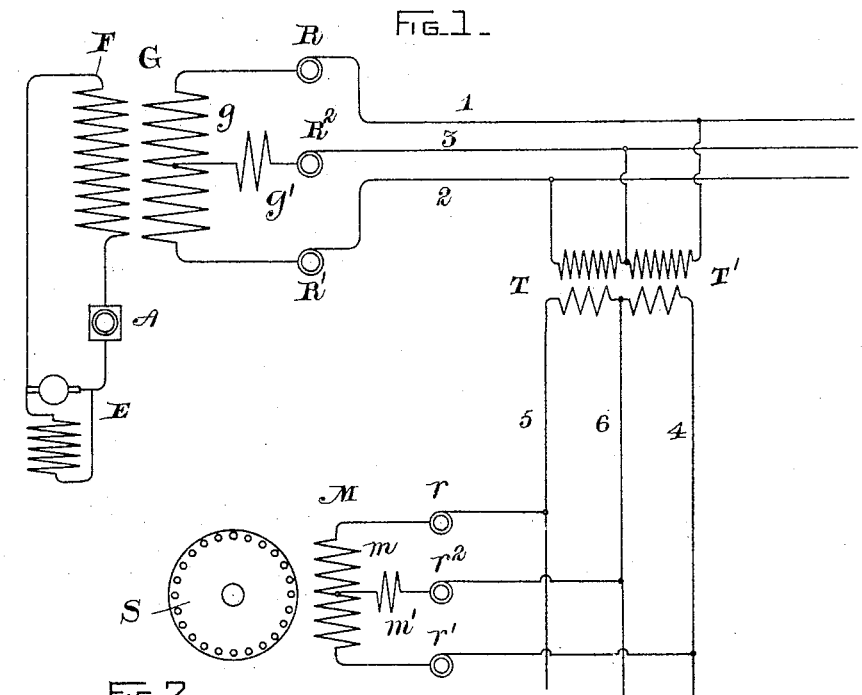
Figure 2:
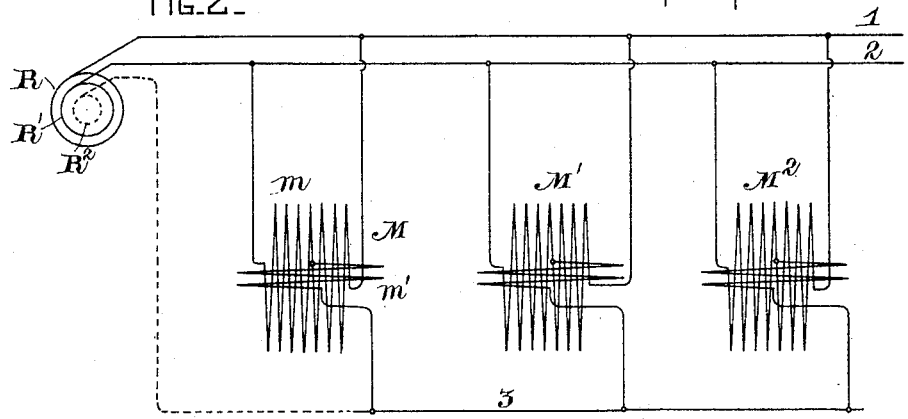

In the drawings illustrating the invention, Figures 1 and 2 are diagrams showing somewhat different power transmission systems, of which the improved motor of this application forms a part.

In Fig. 1, G represents what I have termed in other applications for Letters Patent, a monocyclic generator. The field coil F of the machine, is in circuit with an exciter E of the direct-current type, shown in the drawings as shunt-wound, though it may be of any desired construction. A rheostat A in the main circuit of the exciter, permits the regulation of the generator. The armature of the generator has a main winding $g$, whose terminals are connected to rings R R' leading to mains 1, 2. There is also provided a teaser winding $g'$, connected at one end to the center of the main winding $g$, and at the other end to an intermediate main or balance wire through a collector ring and brush $R^2$.

The induction motor is shown at M. Its primary member is provided with main and teaser windings $m$, $m'$, interconnected and arranged in the same manner as are the corresponding windings of the monocyclic generator. The terminals of these windings are connected by rings $r$, $r'$, $r^2$, to the sub-mains 4, 5, 6. Transformers T T' connect inductively the mains 1, 2, 3, with the service mains 4, 5, 6. The transformers, however, are not a material part of the invention, but ordinarily their presence is desirable, in order to reduce the voltage of the generated currents before feeding them to the motor. The primary and secondary windings of the transformers are connected to the circuit mains in a manner well understood and sufficiently shown in the drawings. They are designed to change the voltage of the transformed currents without altering their phase relation. The secondary member of the motor is shown at S in a conventional manner commonly employed, to represent what is known as the "squirrel-cage" winding. Any of the well-known forms of closed circuit windings, however, may be used.

In operating an induction motor or motors of this description, I prefer that substantially all the energy should be supplied through the outside mains connected to the terminals of the main winding $m$, so that when the motor is in normal operation, it closely resembles a single-phase induction motor. To this end, I prefer to so proportion the windings of the motor and generator that the counter electromotive force developed in the main coil shall be less than the impressed electromotive force generated in the corresponding coil $g$ of the generator. This will permit the motor to take single-phase currents into the winding $m$, which furnish the energy for operating the motor. The teaser coils $m'$ of the motor and $g'$ of the generator will, however, preferably be so proportioned that the impressed electromotive force and the counter electromotive force in the balance wire, to which the free ends of these coils are connected, will be substantially equal when the motor is operating normally, and therefore substantially no current under these conditions will flow over the balance wire. This proportioning of the coils of the motor and generator is indicated in the drawings, where it will be observed that the generator main and teaser coils bear the ratio of four to one, eight turns being shown in the main coil and two in the teaser coil. In the motor, the corresponding coils bear the ratio of seven to two, seven turns being shown in the coil $m$ and two turns in the teaser coil $m'$. These proportions may be considerably departed from, but the arrangement here shown is one well designed for practical use. In practice, of course, there are a number of other factors which must be taken into consideration in balancing the impressed and counter electromotive forces, such as the resistance and self-induction of the coils and connecting mains. Indeed, by suitably varying these last named factors, substantially the same result may be secured as by specially proportioning the coils of the motor and generator.

In Fig. 2, R R' represent conventionally the terminals of a single-phase alternator, of any ordinary type, which are connected to mains 1 and 2. M M' M² represent three induction motors of the type already described, having primary main and teaser coils $m$ $m'$. The coils $m$ are connected across the mains 1 and 2, and the teaser coils $m'$ are connected to the center of the main coils and to a balance wire 3. The primary members, wound as herein indicated, act inductively on closed circuit secondary members constructed and wound in any ordinary manner. When the motors are in normal operation the balance wire will carry substantially no current. Currents, however, may be conveyed over this wire from one motor to another when the motors are loaded unequally, or when one or more of the motors are starting or running at other than the normal speed. The balance wire 3 need not be carried back to the generator, though in some cases it may be desirable to do so, and I have indicated such a connection in dotted lines. In such cases, the generator would be provided with a teaser coil connected to a third ring, as indicated at R².

By the terms "main" and "teaser" coils, as herein used, I refer to coils arranged and proportioned to have the functions already described—that is, the main coil resembles and has the function of the corresponding coil in machines of the single-phase type. It carries substantially all the power current operating the motor under normal running conditions. The primary object of the teaser coil is not to receive power current, but to generate an out-of-phase counter electromotive force normally maintaining a balance between the electromotive forces on the balance wire to which it is connected.

What I claim as new, and desire to secure by Letters Patent of the United States, is—

1. An induction motor having a closed circuit secondary member, and a primary member wound with main and teaser coils interlinked, as described, with one terminal of the teaser coil connected to an intermediate point in the main coil.

2. The combination of a generator having interlinked main and teaser coils, with an induction motor having a closed circuit secondary member and a primary member wound with interlinked main and teaser coils, the main and teaser coils of the generator and motor being so proportioned that the counter electromotive force in the main primary coil of the motor is less than the impressed electromotive force at the terminals of the coil, while the corresponding impressed and counter electromotive forces in the teaser coil are substantially balanced, as described.

3. The combination of two or more induction motors, each having a closed circuit secondary and primary wound with interlinked main and teaser coils, and a balance wire connecting the free terminals of the teaser coils, as described.

In witness whereof I have hereunto set my hand this 16th day of November, 1894.

CHARLES P. STEINMETZ.

Witnesses:
B. B. HULL,
A. F. MACDONALD.